United States Patent [19]

Higashiyama et al.

[11] Patent Number: 4,783,844
[45] Date of Patent: Nov. 8, 1988

[54] APPARATUS FOR TRANSMITTING AND RECORDING SIGNALS

[75] Inventors: Mitsuo Higashiyama, Kanagawa; Michimasa Komatsubara, Chiba; Masato Yamagata, Kanagawa, all of Japan

[73] Assignee: Sony Corporation, Tokyo, Japan

[21] Appl. No.: 870,345

[22] Filed: Jun. 4, 1986

[30] Foreign Application Priority Data

Jun. 20, 1985 [JP] Japan .................. 60-135182

[51] Int. Cl.$^4$ .................................. H04Q 7/00
[52] U.S. Cl. ................................. 455/34; 455/58; 379/62
[58] Field of Search ............ 455/32, 34, 38, 58, 455/68, 70, 352, 88; 379/62, 63, 159, 420

[56] References Cited

U.S. PATENT DOCUMENTS

| 4,639,549 | 1/1987 | Hirayama et al. | 379/62 |
| 4,639,550 | 1/1987 | Yamagawa et al. | 379/62 |
| 4,640,987 | 2/1987 | Tsukada et al. | 379/62 |
| 4,650,928 | 3/1987 | Numata | 379/62 |

FOREIGN PATENT DOCUMENTS

| 2124454 | 2/1984 | United Kingdom . |
| 2138656 | 10/1984 | United Kingdom . |
| 2155280 | 9/1985 | United Kingdom . |
| 2162404 | 1/1986 | United Kingdom . |
| 2163323 | 2/1986 | United Kingdom . |

OTHER PUBLICATIONS

PCT International Application 84/00455, Feb. 2, 1984.
PCT International Application 83/02380, Jul. 7, 1983.
European Patent Application, 148 458, Jul. 17, 1985.

Primary Examiner—Robert L. Griffin
Assistant Examiner—Curtis Kuntz
Attorney, Agent, or Firm—Lewis H. Eslinger; Jay H. Maioli

[57] ABSTRACT

Apparatus for transmitting and receiving signals for use with a so-called cordless telephone, in which an audio signal and an identification code signal are transmitted and received by both the handset and base unit of the telephone and when the identification code signal is not correctly detected, as might be caused by cross-talk interference, the transmitter is disabled and a vacant communication channel is searched for and a communication channel is changed to thereby prevent a cross-talk interference. The unit that does not correctly receive the code signal immediately disables its transmitter and searches for a vacant channel and, because the code signal had been alternately transmitted and received between the two units, the other unit detects the stoppage of code signal transmission, disables its own transmitter, and then also moves to the next vacant channel to await further transmission of the code signal.

5 Claims, 5 Drawing Sheets

APPARATUS FOR TRANSMITTING AND RECORDING SIGNALS

BACKGROUND OF THE INVENTION

1. Field of the Invention

This invention relates generally to apparatus for transmitting and receiving signals and, more particularly, is directed to an apparatus for transmitting and receiving signals as found in a so-called cordless telephone.

2. Description of the Background

The standard telephone consists of a base unit and a handset unit connected to each other by an electrical cord. The base unit is connected by another cord to the telephone line network that is essentially worldwide. Although it is possible to speak with someone almost anyplace in the world it is necessary to stay within the electrical cord length of base unit. The simple fact that there is always a continuous physical connection between the person making the phone call and the fixed base unit can be a great inconvenience. This brought about the advent of the cordless telephone, which represents a significant improvement over the standard telephone.

In the cordless telephone, the handset and the base unit are not connected by a wire or cord but are connected only by radio waves. Thus, the only limitation on the movement between the base unit and the handset is the ability to maintain radio contact and, of course, applicable statutes and rules governing public communications.

Nevertheless, the cordless telephone also presents certain difficulties. In particular, there are a limited number of channels available for the radio communication between the handset and the base unit, therefore, if several cordless telephones are being used within the same general area there is a good chance that the signal transmitted from one handset unit to its own base unit may be picked up by the base unit of a neighboring cordless telephone, leading to crosstalk interference.

Accordingly, in such case, it is necessary to change the radio communication channel that was initially assigned to that particular cordless telephone. In order to change the communication channel established between the handset and the base unit, the operator has to change-over channel switches provided in both the handset and the base unit. Furthermore, because the handset and the base unit are usually distant from each other, it is very inconvenient and cumbersome to change the communication channel by operating the switches of the handset and the base unit of the cordless telephone system. In addition, even if the communication channel is changed, it is frequently the case that the communication link will still not be satisfactory, in which case it is necessary for the user to again change both the switches of the handset and the base unit at the same time.

OBJECTS AND SUMMARY OF THE INVENTION

Accordingly, it is an object of the present invention to provide an improved apparatus for transmitting and receiving signals that can eliminate the above-noted defects inherent in the systems known heretofore.

Another object of this invention is to provide an apparatus for transmitting and receiving signals so that telephone communication can be carried out satisfactorily without any cross-talk interference.

A further object of this invention is to provide apparatus for transmitting and receiving signals in which when cross-talk interference is detected, a vacant communication channel is searched for and the communication carried out through this new communication channel.

A still further object of this invention is to provide apparatus for transmitting and receiving signals is particularly applicable to a so-called cordless telephone.

In accordance with an aspect of the present invention there is provided apparatus for transmitting and receiving signals between first and second transmitter-receivers over a communication channel in which the first transmitter-receiver includes a first transmitter for transmitting a code signal and a first receiver for receiving a code signal and the second transmitter-receiver includes a second transmitter for transmitting a code signal and a second receiver for receiving a code signal, wherein when the first transmitter-receiver does not correctly receive the code signal, a communication channel which is not then occupied by the first transmitter-receiver is searched for and the signal is then transmitted and received over this new communication channel.

The above and other objects, features, and advantages of the present invention will become apparent from the following detailed description of the preferred embodiment taken in conjunction with the accompanying drawings, in which like reference numerals designate like elements and parts.

DESCRIPTION OF THE PREFERRED EMBODIMENT

Figure 1:
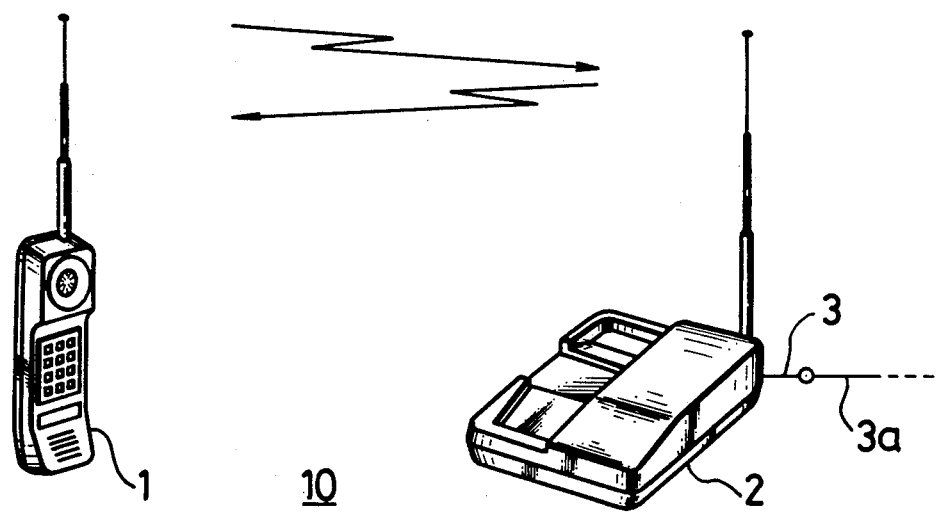
FIG. 1 is a pictorial representation of a cordless telephone system to which the present invention is applicable.

FIG. 1 is a pictorial representation of a conventional cordless telephone system 10 to which this invention can be applied. This cordless telephone system 10 includes a handset unit 1 and a base unit 2. Base unit 2 is connected by a telephone cord 3 to an outlet or receptacle in a wall, telephone pole, or another fixed structure, so that it may both receive and transmit message signals through a telephone network line 3a and also may be powered thereby. Accordingly, the telephone subscriber can make telephone calls and receive them just as in a conventional telephone.

In the conventional cordless telephone, base unit 2 is still connected to the receptacle on the wall or the like by cord 3 so that message signals from telephone network line 3a may be received and transmitted, however, handset unit 1 of cordless telephone system 10 is an independently operating unit, from which calls may be made and by which calls may be received with no physical connection to base unit 2. Instead, base unit 2 and handset unit 1 of cordless telephone system 10 communicate with each other over a communication channel established by the transmission and reception of electromagnetic waves, more particularly, by radio waves. Handset unit 1 may be taken anywhere within a specified service area, which may involve distances of up to about 300 meters from base unit 2, while still making and receiving telephone calls. The frequencies of the radio waves transmitted between handset unit 1 and base unit 2 are typically 49 MHz in th upper link and 46 MHz in the lower link of the dual communication channel. There are usually ten duplex or dual channels permitted for each system by the Federal Communications Commission (FCC), but each individual set is usually only provided with two different duplex channels because of the cost of the crystals used in the oscillator.

Figure 2:
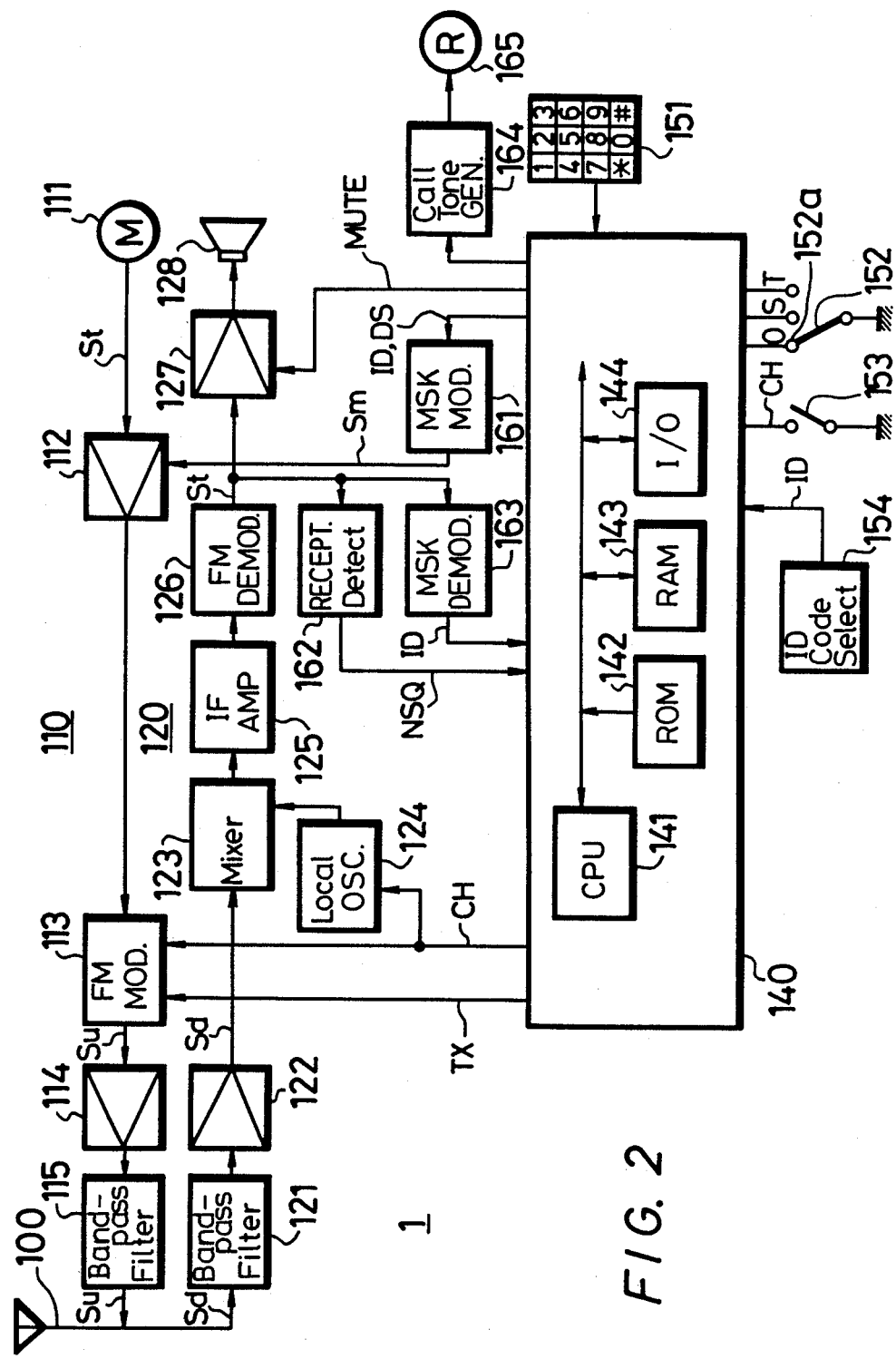
FIG. 2 is a schematic in block diagram form of a circuit for a handset unit of at unit of the cordless telephone system in FIG. 1 according to the present invention.
Figure 3:
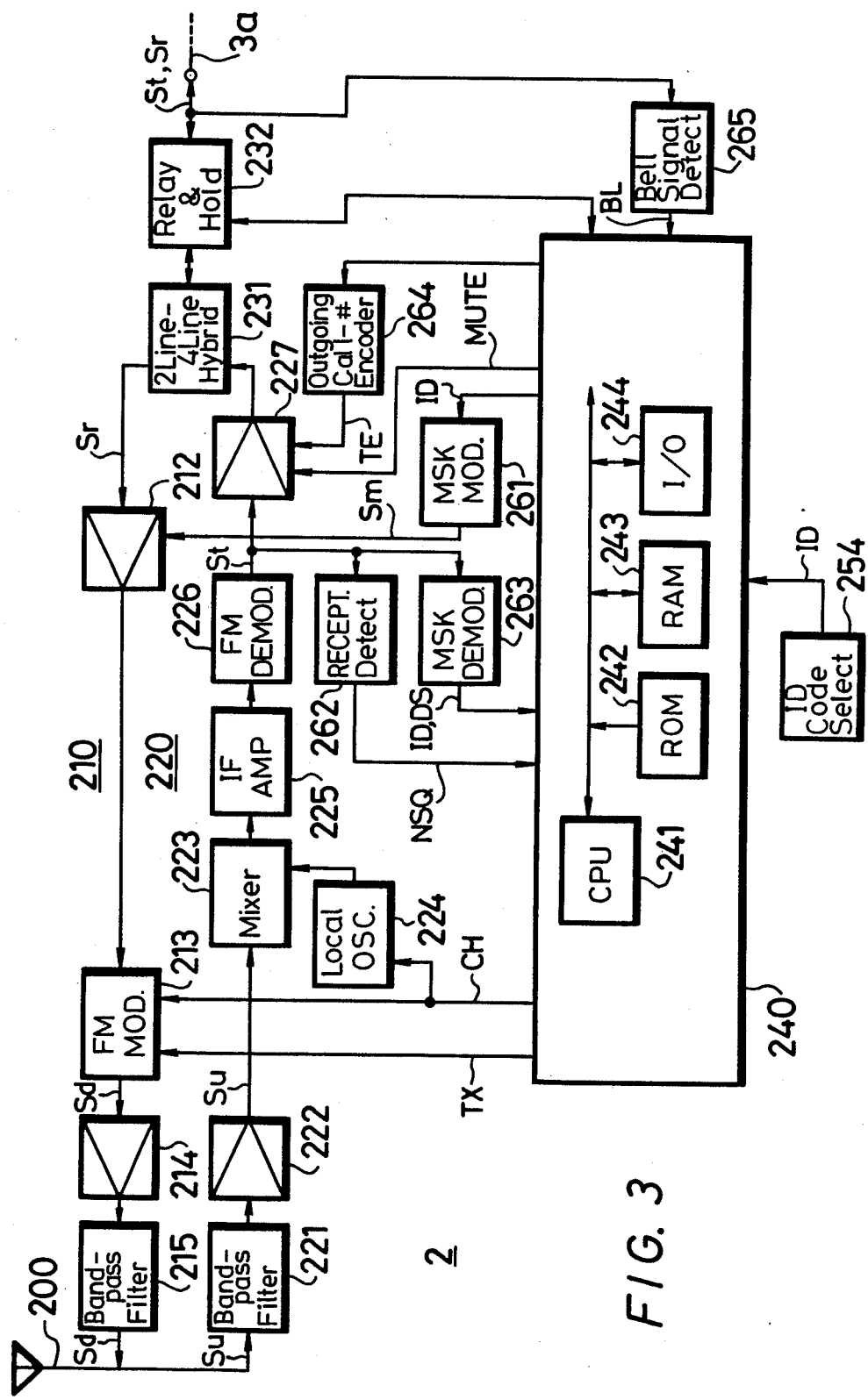
FIG. 3 is a schematic in block diagram form of a circuit for a base unit of the cordless telephone system shown in FIG. 1 according to the present invention.

Referring to FIGS. 2 and 3, important portions of the circuitry contained within the handset unit 1 and the base unit 2, respectively are therein illustrated. Handset unit 1 (FIG. 2) includes a transmitter 110, including elements 111 to 115, and a receiver 120, including elements 121 to 128. The base unit 2 (FIG. 3) similarly includes a transmitter 210, including elements 212 to 215, and a receiver 220, including elements 221 to 227. Base unit 2 also includes a signal transmission circuit, having elements 231 and 232, that serves to link transmitter 110 and receiver 120 to telephone network line 3a. In the illustrated embodiment, the signals are transmitted over a selected one of two duplex channels in the system, each containing an upper channel and a lower channel, so-called because of the relative frequencies assigned thereto.

When transmitting a signal from handset unit 1 to base unit 2 and onto network line 3a, an audio signal St from a microphone 111 of handset unit 1 is supplied through an audio frequency amplifier 112 to a frequency modulating circuit 113, in which it is converted to an FM signal Su in the upper frequency channel of a selected one of the available duplex channels. The signal Su is supplied through a high-frequency power amplifier 114 to a bandpass filter 115, which has a pass band centered on this upper frequency channel, to an antenna 100, by which it is transmitted as a radio frequency wave to base unit 2.

Referring now to FIG. 3, the signal Su that was transmitted from handset unit 1 is received at base unit 2 by an antenna 200 and is supplied through a bandpass filter 221, which has a pass band including the upper frequency channel, and through a high-frequency amplifier 222 to a mixing circuit 223. The mixing circuit 223 receives a local oscillation signal having a predetermined frequency from a local oscillator 224, whereby signal Su is converted to an intermediate frequency signal. This intermediate frequency signal is supplied through an intermediate frequency (IF) amplifier 225 to an FM demodulator 226, wherein it is demodulated to produce the audio signal St. The audio signal St is delivered to the telephone network line 3a through an audio frequency amplifier 227 and the signal transmission circuit comprising a two-line to four-line converting circuit, that is, a hybrid circuit 231 and a relay 232.

The relay circuit 232 can include a relay to make and break the connection between the base unit 2 and the telephone network line 3a and a hold relay, which can hold a connection with the telephone network line 3a after it is connected to the base unit 2, so as to allow the telephone communication between the base unit 2 and the telephone network line 3a to be temporarily interrupted, while keeping the incoming call available on the telephone network line 3a.

When incoming message signals are received by base unit 2 from telephone network line 3a, an audio signal Sr is supplied through relay circuit 232, through hybrid converting circuit 231, and through an audio frequency amplifier 212 to a frequency modulation (FM) circuit 213, in which it is converted to an FM signal Sd in the lower frequency channel of the same duplex channel as signal Su. The FM modulator 213 is supplied with a channel selecting signal CH for this purpose. Signal Sd is supplied through a high-frequency power amplifier 214 and a bandpass filter 215, which has a pass band centered on the lower frequency channel, to antenna 200 by which it is transmitted to handset unit 1.

FIG. 2 shows handset 1 at which the signal Sd from base unit 2 is received by antenna 100 and is supplied through a bandpass filter 121, which has a pass band centered on the lower frequency channel, and through a high-frequency amplifier 122 to a mixing circuit 123. Mixing circuit 123 is supplied with a local oscillation signal having a predetermined frequency from a local oscillator 124 that also receives the channel selecting signal CH, so that the signal Sd is frequency-converted to an FM intermediate frequency signal. This FM signal is supplied through an intermediate frequency (IF) amplifier 125 to an FM demodulation circuit 126, wherein it is demodulated to an audio signal St and supplied through an audio frequency amplifier 127 to the electro-audio transducer or loudspeaker 128 in handset unit 1.

In accordance with an important aspect of the present invention, handset unit 1, as shown in FIG. 2, further contains a control circit 140 and base unit 2, as shown in FIG. 3, similarly contains a control circuit 240. These control circuits are advantageously comprised of a respective microprocessor or microcomputer, each contained on a single integrated chip. Control circuit 140 is a one-chip type microcomputer and includes a central processing unit (CPU) 141, which may be adapted for 4-bit parallel processing, a read only memory (ROM) 142, which stores control programs for controlling the operation of CPU 141, a random access memory (RAM) 143 serving as a work and storage area, and an input/output (I/O) port 144.

Similarly, in base unit 2, control circuit 240 includes a CPU 241, a ROM 232, a RAM 243 and an I/O port 244, each performing a function corresponding to that of the element of the control circuit 140.

Control circuit 140 of handset 1 is connected to be controlled by a rotary dial or ten-key keypad 151, a talk switch 152, a channel switch 153, and ID code select switches 154. Keypad 151 has conventional non-lock push buttons for inputting the telephone number to be called, and talk switch 152 is a three-position change-over switch used for selecting the operational mode of handset unit 1. When a movable contact 152a of talk switch 152 contacts fixed contact O, the power is turned off to all elements within handset unit 1, except control circuit 140, thereby placing handset unit 1 in the off mode. When movable contact 152a contacts fixed contact S, control circuit 140 is placed in the standby mode to await signal Sd from base unit 2. When the movable contact 152a contacts fixed contact T, handset unit 1 is placed in the talk mode and the communication channel between handset unit 1 and base unit 2 can be established. Normally, movable contact 152a is set to standby contact S.

Further, switch 153 is of the non-lock type push switch to change the communication channel being used. ID code select switches 154 are used to select the identifying code (ID) that is fed to control circuit 140 and may be advantageously embodied as a dual in-line package (DIP) switch that has a number of switches contained in one unit. The respective outputs from these keys and switches 151 to 154 are supplied to control circuit 140 for processing.

A minimum shift keying (MSK) modulation circuit 161 is connected to control circuit 140 for converting binary signals supplied thereto by control circuit 140 to an MSK signal Sm in the audio frequency band. Minimum shift keying is a special form of frequency shift keying (FSK) in which the frequency shift in modulation is set to one-half the bit rate frequency. The binary signals that are input to MSK modulator 161 include the identifying code ID, which will be described in greater detail hereinbelow, and a dial signal DS corresponding to the telephone number entered through keypad 151. The MSK signal Sm is then supplied to audio frequency amplifier 112 for transmission to base unit 2 in the manner already described. Base unit 2 of FIG. 3 also contains a similar MSK modulating circuit 261 for encoding the identifying code ID, the dial signal DS, and other signals from control circuit 240 into signal Sm to be transmitted from base unit 2 to handset unit 1.

The output of FM demodulating circuit 126 is also supplied to a reception detecting circuit 162 for detecting the presence or absence of the signal Sd in the output. As is well known, the frequency components of the output from demodulating circuit 126 are different depending on the presence or absence of the signal Sd. A detection signal NSQ generated by the reception detecting circuit 162 when the signal Sd is present, and detection signal NSQ is fed to control circuit 140. In handset unit 1 an MSK demodulation circuit 163 is supplied with the output of FM demodulating circuit 126 to demodulate the identifying code ID and other informational signals encoded in the MSK signal Sm. The signals demodulated by MSK demodulator are fed to control circuit 140.

When an incoming call is detected in base unit 2 and signal Sd is transmitted to handset unit 1, signal NSQ is supplied to control circuit 140 by reception detection circuit 162, and an appropriate signal is supplied to a call tone generator 164 for generating a bell signal (ring tone signal). The signal from call tone generator 164 is fed to a ringer 165 to generate a bell sound, thus, the telephone rings.

The control circuit 140 also generates the channel selecting signal CH and a control signal TX both of which are fed to frequency modulation circuit 113 to control whether FM signal Su is output therefrom. This is in accordance with an aspect of the present invention wherein the communication channel is established only when there is detected an identity between identifying codes stored in base unit 2 and handset unit 1. As will be explained further, when such identity is detected, signal TX enables the frequency modulation circuit 113 to output signal Su, whereas if no identity is detected, signal TX disables the frequency modulation circuit 113.

Control circuit 140 also generates a muting signal MUTE which is supplied to the audio frequency amplifier 127. As is conventional, the muting signal MUTE is produced when no telephone conversation is in progress to prevent extraneous noise from being generated and output through loudspeaker 128.

Control circuit 240 of base unit 2 is similar to control circuit 140 of the handset unit 1 and performs many corresponding functions. Most importantly, control circuit 240 provides similar means for detecting when the two identifying codes, one stored in base unit 2 and one received from handset unit 1, are or are not identical, and for supplying the control signal TX to the FM modulators 213 to establish or cut off transmission of signal Sd, depending upon such identity. Thus, control circuit 240 includes CPU 241, ROM 242, RAM 243, and I/O port 244.

Also, in base unit 2 ID code select switches 254 and the circuits 261 to 264 are similar in operation to ID code select switches 154 and the circuits 161 to 164 of handset unit 1, so that a detailed explanation thereof can be omitted. In this case, however, the circuit 264 that corresponds to tone generating circuit 164 generates a tone encode signal TE corresponding to the telephone number entered for an outgoing call. Signal TE is supplied to audio frequency amplifier 227 and thence to circuit 231 for transmission onto the telephone network line 3a.

A bell sound signal detecting circuit 265 is connected to telephone network line 3a to detect a ring signal indicating an incoming call, and the output BL of bell signal detecting circuit 265 is supplied to control circuit 240.

When an outgoing call is to be made using handset unit 1, the operation of the cordless telephone system 10 is controlled by the control circuits 140 and 240 under control of control programs stored in ROMs 142 and 242. To make an outgoing call, the contract 152a is set to the talk or fixed contact T, and an indication thereof is sent to CPU 141 and control signal TX is generated to enable frequency modulating circuit 113 to transmit a signal, which at this initial time in the operation is an unmodulated carrier signal. CPU 141 then derives an identifying signal ID from RAM 143, which had been previously generated and stored during an operation which will be described in detail hereinafter. The identifying code ID is supplied to MSK modulating circuit 161, which converts it to the MSK signal Sm and supplies it to FM modulator 113 through amplifier 112. Because FM modulator 113 has been enabled by signal TX to transmit signals, the identifying code ID is transmitted to base unit 2 in the FM signal Su.

When the FM signal Su is received by base unit 2, reception detecting circuit 262 generates the signal NSQ in response to the presence of the signal Su, and in response to signal NSQ control circuit 240 enters a check mode to check for identity between the received identification code and the stored identification code. The signal Sm is derived from the received signal Su in FM demodulator 226 and the identifying code ID in the signal Sm is derived in MSK demodulator 263 and fed to CPU 241. CPU 241 then reads an identifying code ID, which was previously stored in RAM 243 by setting the switches in selector 254, and determines whether or not the two identifying codes are the same. If they are not identical, this usually means that the telephone call is being made by the handset of a different cordless telephone set and signal TX is adjusted to disable the FM demodulator 213 so that further signal transmission is cut off and the cordless telephone system 10 remains in the standby mode. On the other hand, if the identification codes ID are determined to be the same, FM modulator 213 remains enabled and transmits the signal Sd to establish the communication channel. In such case, control circuit 240 stops producing the muting signal MUTE and amplifier 227 is released from its muting state, so that the desired conversation can take place. Furthermore, since the signal Sd is transmitted back to handset unit 1 after the identity of the identifying codes has been detected in base unit 2, the signal NSQ in handset unit 1 is supplied to control circuit 140, which produces the signal TX so as to enable FM modulator 113, and which stops producing the muting signal MUTE to release audio frequency amplifier 127 from its muting state. Thus, handset unit 1 is also enabled.

At this time, when ten-key keypad 151 of handset 1 is operated to select the telephone number to be called, a dial signal DS corresponding to that telephone number is generated in CPU 141. This dial signal DS is then supplied to MSK modulator 161 for conversion to the MSK signal Sm, which is then transmitted to the base unit 2. When signal Sm, which is formed as signal Su, is received by base unit 2, the dial signal DS is derived by the MSK demodulating circuit 263. In response thereto, the control circuit 240 causes the tone generating circuit 264 to generate the tone encode signal TE, which corresponds to the number of the telephone to be called, and is transmitted through audio frequency amplifier 227, hybrid converting circuit 231, and relay circuit 232 to telephone network line 3a.

Accordingly, the telephone unit to be called is obtained through the telephone system by this tone encode signal TE and, when this outgoing call is received, the communication channel is established as described. The subsequent operation of the cordless telephone system 10 in transmitting and receiving the telephone message signals is as described above and such description need not be repeated.

In operation of the cordless telephone system 10 when an incoming call is received, assuming that the movable contact 152a of the talk switch 152 is at the contact S, the cordless telephone system 10 is in the standby mode ready to receive a call. When an incoming message signal on the telephone network line 3a is received by base unit 2, the bell sound signal BL is derived from bell sound detector 265 and supplied to CPU 241 of base unit 2. The signal TX is generated by controller 240 to enable FM modulator 213 to transmit the FM signal Sd. The identifying code ID read from RAM 243 is converted to the signal Sm by MSK modulator 61 and supplied to audio frequency amplifier 212, so that the identifying code ID is transmitted by way of signal Sd to handset unit 1.

Continuing this operational example, when the signal Sd is received in handset unit 1, the signal NSQ is derived from detecting circuit 162 to set control circuit 140 in the check mode to check the identifying code ID transmitted by the base unit. The identifying code ID is derived from the received signal in the MSK demodulator 163 and CPU 141 checks for exact correspondence between the received identifying code ID and the stored identifying code D, which was entered into RAM 143 by switches 154. If the two ID codes are not identical, the control signal TX disables frequency modulation circuit 113, and the telephone remains in the standby mode. If the two identifying codes are identical, frequency modulation circuit 113 remains enabled, and the signal Su is transmitted to base unit 2, which derives the signal NSQ, so that base unit 2 remains enabled and the communication channel is established. Bell tone generator 164 in handset 1 produces a bell sound signal, which is supplied to ringer 165 to announce the incoming call. Thereafter, if handset unit 1 is picked up, and talk button 152 is set to talk contact T, loudspeaker 128 stops ringing, amplifiers 127 and 227 are released from the muting mode, and handset unit 1 receives the incoming call.

Figure 5:
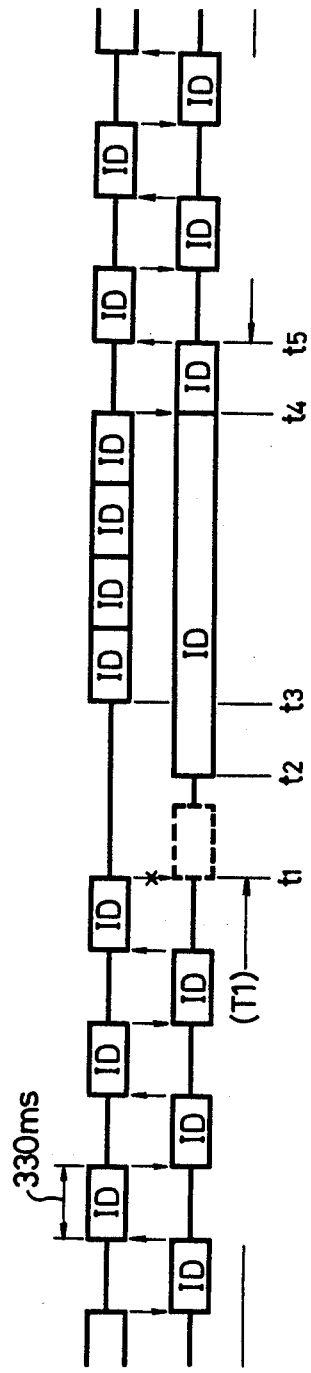
FIG. 5 is a timing chart useful in explaining a method of checking the occurence of cross-talk interference using a check signal.

In accordance with the teaching of the present invention, the ID or check signal is alternately transmitted and received by the respective units with a timing shown in FIG. 5 under the control of the operational instructions stored in the ROMs 142 and 242, to thereby check the presence or absence of cross-talk interference, which might be caused by signals from units other than those in the particular cordless telephone or could be from any of the other well-known RF interference sources. In the presence of detected cross-talk interference, the communication channel over which the handset and base unit transmit and receive is changed when following the teaching of the present invention.

Figure 6B:
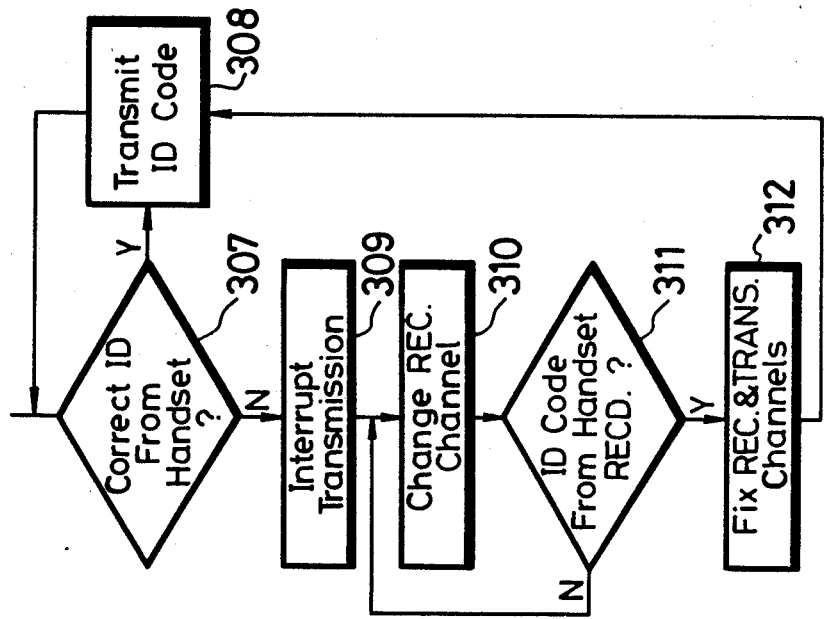
FIGS. 6A and 6B are flow charts useful in explaining the operation of the handset unit and the base unit, respectively.
Figure 6A:
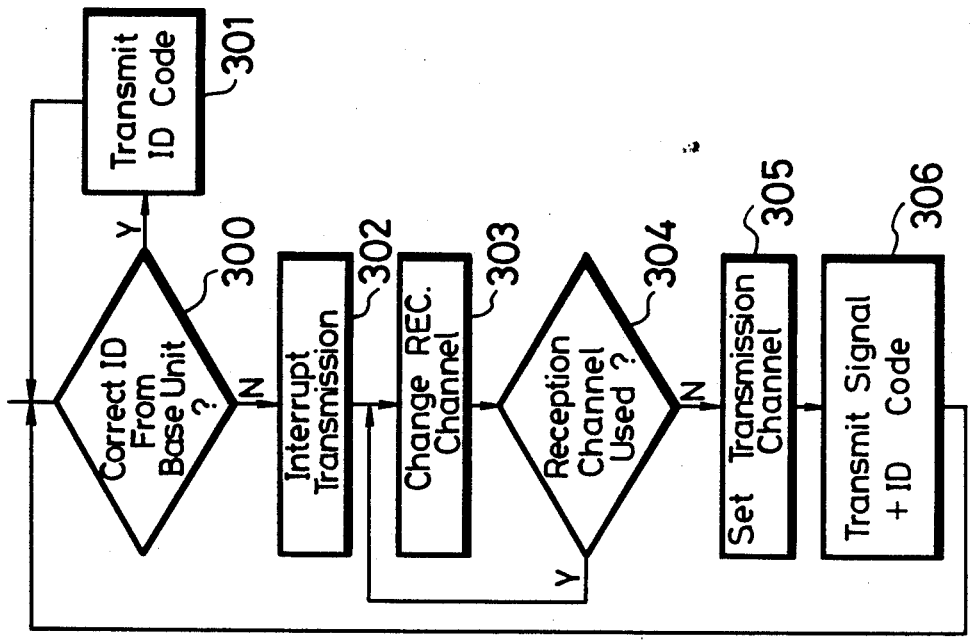

The operations of handset unit 1 and base unit 2, as determined by the respective operational instructions, are represented in the flow charts forming FIGS. 6A and 6B.

During communication, the identifying code ID for the channel set in the handset is derived in control circuit 40, supplied to MSK modulator 161, and converted therein to the MSK signal Sm. The MSK signal Sm is supplied to amplifier 112, in which it is frequency-multiplexed with the audio signal St from microphone 111 and transmitted to base unit 2 as the FM signal Su. This frequency multiplexing relationship is shown clearly in FIG. 4. As an example in this case, the transmission rate of the identifying code ID is 110 bps and the duration of time identifying code ID in of signal Sm is 330 ms, as shown in FIG. 5.

Figure 4:
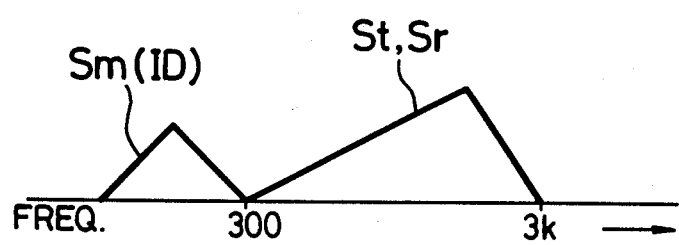
FIG. 4 is a plot of the frequency spectrum of the code signals and audio signals used in an embodiment of this invention.

The signal Sm is received by base unit 2 and the identifying code is derived by MSK demodulator 263 and fed to the control circuit 240 to determine whether the correct identifying code ID has been received. When the correct identifying code ID has been determined to be received by base unit 2, the identifying code ID is similarly formed by control circuit 240 and supplied to MSK modulator 261, in which the signal Sm based on the identifying code ID is frequency multiplexed with the audio signal Sr from the incoming call and is then transmitted to handset unit 1 as the signal Sd. This frequency multiplexing relationship is shown in FIG. 4.

Then, in handset unit 1 the signal Sm is received and the identifying code ID is derived in the MSK demodulator 163 and is supplied to control circuit 140 which checks whether the correct identifying code ID has been received by handset unit 1. If it is received correctly, the identifying code ID is transmitted from the handset unit 1 as described above.

When the identifying code ID is received correctly, that is, no cross-talk interference takes place, as shown over a period of time T1 in FIG. 5, handset unit 1 receives the identifying code ID from base unit 2, handset unit 1 transmits the identifying code ID to base unit 2, and vice versa. In other words, the identifying code ID is alternately transmitted and received back and forth between the two units to monitor the receiving state.

This continuous interrogation is represented in FIGS. 6A and 6B and, referring specifically to FIG. 6A, when handset unit 1 receives the correct identifying code ID from the base unit 2, as represented by a YES at decisional step 300, handset unit 1 is instructed to transmit the identifying code ID at step 301. Similarly in FIG. 6B, when base unit 2 receives the correct identifying code ID from handset unit 1, as represented by a YES at decisional step 307, base unit 2 transmits the identifying code ID at step 308.

If cross-talk interference occurs at some time $t_1$ as shown in FIG. 5, so that the base unit 2 does not receive the correct identifying code ID, the transmission of the identifying code ID from base unit 2 to handset unit 1 is interrupted, as represented at step 309 in FIG. 6B and as shown by a broken line in FIG. 5, and amplifier 227 is muted by the signal MUTE from controller 240. Because handset unit 1 can know the timing at which after handset unit 1 has transmitted the identifying code ID to base unit 2 the base unit 2 should transmit the corresponding identifying code ID, if that corresponding identifying code ID transmitted by base unit 2 is not obtained by handset at the correct time point, the transmission of the identifying code ID from handset unit 1 to base unit 2 will be interrupted, as represented at step 302 in FIG. 6A, by the signal TX and then from a time point $t_2$, the reception channel of the signal Sd is sequentially changed by signal CH fed to the FM modulator, as represented at step 303 in FIG. 6A. This sequential change occurs channel-by-channel throughout the available channels and after every change, the signal NSQ is used to check whether or not the newly selected reception channel is the one being used. If it is used, the reception channel is changed again to the next channel, as represented as YES at step 304 in FIG. 6A. At that time, the muting is also applied to amplifier 127 by the signal MUTE. It is noted that although the FCC makes available ten different dual channels, commercial cordless telephones usually only have two different channels.

The reception channel is sequentially changed until a vacant channel is found at some time $t_3$ in FIG. 5. Thereafter, the reception channel is fixed to the corresponding vacant channel by the signal CH from controller 140, and the transmission channel is fixed to the corresponding vacant channel, as represented at step 305 in FIG. 6A, and FM modulator 113 is enabled by the signal TX to transmit the signal Su, and the identifying code ID is repeatedly transmitted through this new channel, as represented at step 306 in FIG. 6A.

On the other hand, because the base unit 2 also knows the timing at which, after base unit 2 has transmitted the identifying code ID, handset unit 1 should transmit back the corresponding identifying code ID, if that corresponding identifying code ID is not transmitted from handset unit 1 at the corresponding correct time point $t_1$, the transmission of the identifying code ID from base unit 2 to handset unit 1 is interrupted by the signal TX, as represented at step 309 in FIG. 6B, and a reception channel for receiving the signal Su is sequentially changed at the time point $t_2$ of FIG. 5, as represented at step 310 in FIG. 6B. In this case, each time the reception channel is changed channel-by-channel, it is checked whether or not the identifying code ID from handset unit 1 is received by base unit 2. If it is not received, the reception channel is changed to the next successive channel, as represented at step 311 in FIG. 6B.

When the reception channel of base unit 2 becomes the same as the new channel of handset unit 1 at time $t_4$, the identifying code ID from handset unit 1 is received by base unit 2 and if this identifying code ID is correctly received, the reception channel of the base unit 2 is fixed to the corresponding channel by the signal CH after a next time point $t_5$ and the following, as represented at step 312 in FIG. 6B. Also, the transmission channel is fixed to the corresponding channel, and the transmission of the signal Sd is allowed by the signal TX and the identifying code ID is transmitted, as represented at step 308 in FIG. 6B. Further, the amplifier 227 is released from muting by the signal MUTE. Handset unit 1 receives this identifying code ID from base unit 2 so that thereafter amplifier 127 is released from muting by the signal MUTE and in a situation similar to that shown during the period T1, the identifying code ID is alternately transmitted and received between handset unit 1 and base unit 2. Accordingly, the telephone call can be made without the cross-talk interference from the time $t_5$ on.

Figure 7:
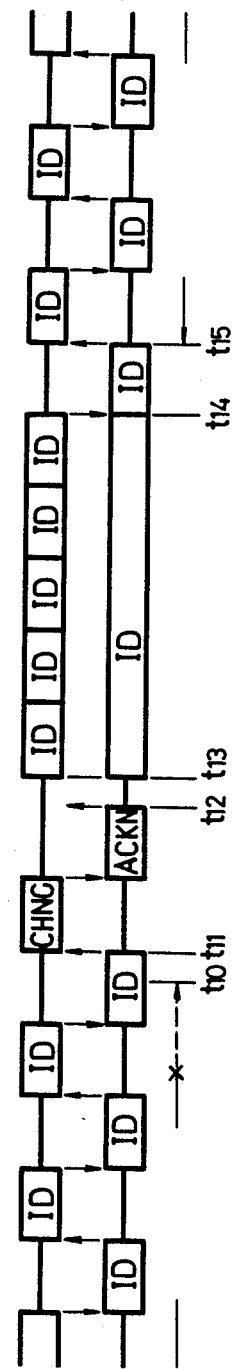
FIG. 7 is a timing chart useful in explaining the operation of changing the communication channel when cross-talk interference occurs.

Even if the control circuit 140 judges the absence of the cross-talk interference because the identifying code ID is transmitted and received correctly between the handset unit 1 and the base unit 2, it frequently is the case that the operator detects the presence of some cross-talk interference. In such case, if the operator manually actuates channel switch 153, the communication channel will be changed. More specifically, as shown in FIG. 7, if channel switch 153 is actuated at a desired time $t_{10}$, at time $t_{11}$ when the identifying code ID is to be next transmitted from the handset unit 1, instead of that identifying code ID, a code CHNG indicative of the change of the communication channel is transmitted in the state of signal Sm. When this code CHNG is received by base unit 2, an answer code ACKN indicating the reception of the code CHNG is transmitted to handset unit 1, again in the form of the signal Sm. Then, from time $t_{12}$ at the end of this code ACKN, handset unit 1 starts searching for a vacant channel. The operations at time $t_{12}$ and the following are exactly the same as those of time $t_2$ and following, hence, time $t_{12}$ to $t_{15}$ correspond to the time points $t_2$ to $t_5$ of FIG. 5. In other words, when the vacant channel is found at time $t_{13}$, the identifying code ID is thereafter transmitted from handset unit 1 through the above-mentioned vacant channel. When base unit 2 receives the corresponding identifying code ID at time $t_{14}$, the identifying code ID is transmitted and received at time $t_{15}$ and the following, and the communication channel is established again.

According to the invention as set forth above, when the communication channel is established, the check signal based on the identifying code ID is alternately transmitted and received back and forth between the handset unit and the base unit to monitor or check whether or not cross-talk interference occurs. When the occurrence of the cross-talk interference is detected by an incorrectly received code signal, a vacant channel is searched for automatically, or manually if the operator actuates a specific switch, and the communication channel is established again through this vacant channel. Thus, it is possible to always maintain communications of good quality without cross-talk interference. In addition, it is not necessary for the operator holding the handset to go to the base unit and then manually to change the communication channel thereof. Also, the operations of circuits 161 to 163 and circuits 261 to 263 can be realized by a software implementation, and also the telephone number to be called can be transmitted by dial pulses. Furthermore, this invention can be applied not only to the cordless telephone but also to a transceiver, or a carrier-type interphone using a commercially available AC power source line and the like.

The above description is given on a single preferred embodiment of the invention, but it will be apparent that many modifications and variations could be effected by one skilled in the art without departing from the spirit or scope of the novel concepts of the invention, which should be determined by the appended claims.

What is claimed is:

1. Apparatus for transmitting and receiving audio signals between remote locations, comprising:

first and second transmitter-receiver units, each having a plurality of channels for transmitting and receiving audio signals, each said unit respectively including means for producing a code signal for transmission and reception between said first and second units, each of said units further comprising means for detecting correct reception of said code signal and setting said first and second transmitter-receiver units to the same one of said plurality of channels upon a detected correct reception and producing an interrupt signal when said code signal is not correctly received, means for searching for a vacant one of said plurality of channels in response to said interrupt signal, and means for selecting a vacant one of said plurality of channels as a communication channel for transmission and reception of said audio signals, said first and second transmitter-receiver units including means for repeatedly transmitting said code signal with said audio signals during communication over said communication channel, said means for detecting detecting incorrect reception of said code signal and producing said interrupt signal so that another vacant channel is searched for, whereby said audio signal and said code signal are then transmitted and correctly received by each of said first and second transmitter-receiver units over said another vacant channel.

2. Apparatus according to claim 1, in which said means for detecting correct reception of said code signal includes a minimum shift key demodulator for producing a demodulated identification signal therefrom, a memory having a selected identification signal recorded therein and a comparison means for comparing said demodulated identification signal and said selected identification signal for producing a signal indicating a correct reception of said transmitted code signal.

3. Apparatus according to claim 1, in which said first transmitter-receiver unit is formed as a portable unit.

4. A method for use with two transmitter-receiver units that form a system for transmitting and receiving communication signals between two spaced-apart locations over a selected one of a plurality of communication channels, in which both units have the same selected identification code, comprising the steps of:

transmitting and receiving an identification code signal alternately from one unit to the other unit;

detecting at each unit whether the identification code signal is correctly received and producing an indication of an incorrect reception of the code signal;

disabling a transmitter at each unit in response to the indication that the identification code signal is incorrectly received during the respective time period;

searching at each unit for an unused one of said plurality of channels;

changing the transmission channel at each unit to an unused channel and designating said unused channel as the communication channel;

enabling the transmitter at each unit and resuming alternate transmission and reception of the identification code signal over the newly selected channel;

continuously transmitting said communication signals and said identification code signals during communication over said designated communication channel;

continuously detecting correct reception of said identification code signal during communication over said designated communication channel; and repeating the steps of searching, changing, and enabling upon said indication of an incorrect reception of said identification code signal.

5. A method according to claim 4, including the further steps of manually selecting an unused channel at one of said units, generating and transmitting a change signal CHNG to the other of said units, generating and transmitting an acknowledge signal ACKN to said one of said units upon receipt of said change signal, and transmitting and receiving the identification code signal over the manually selected unused channel.

* * * * *